US009076338B2

(12) United States Patent
Taguchi et al.

(10) Patent No.: US 9,076,338 B2
(45) Date of Patent: Jul. 7, 2015

(54) TRAVEL CONTROL PLAN GENERATION SYSTEM AND COMPUTER PROGRAM

(75) Inventors: Koji Taguchi, Isehara (JP); Makoto Aso, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1425 days.

(21) Appl. No.: 12/515,391

(22) PCT Filed: Nov. 20, 2007

(86) PCT No.: PCT/JP2007/072885
§ 371 (c)(1),
(2), (4) Date: May 18, 2009

(87) PCT Pub. No.: WO2008/062897
PCT Pub. Date: May 29, 2008

(65) Prior Publication Data
US 2010/0042282 A1 Feb. 18, 2010

(30) Foreign Application Priority Data
Nov. 20, 2006 (JP) ................. 2006-313258

(51) Int. Cl.
*G05D 1/00* (2006.01)
*B60W 40/04* (2006.01)
(Continued)

(52) U.S. Cl.
CPC .............. *G08G 1/161* (2013.01); *B60W 10/06* (2013.01); *B60W 10/184* (2013.01); *B60W 10/20* (2013.01);
(Continued)

(58) Field of Classification Search
CPC ......... G01S 13/06; G01S 13/04; G01S 13/50; G01S 13/931; G01S 13/9353; G01S 13/9321

USPC .......................................................... 701/25
See application file for complete search history.

(56) References Cited

U.S. PATENT DOCUMENTS 4,986,384 A  1/1991  Okamoto et al.
5,761,630 A  6/1998  Sekine et al.
(Continued)

FOREIGN PATENT DOCUMENTS

EP  1 332 910 A1  8/2003
EP  1 598 233 A2  11/2005
(Continued)

OTHER PUBLICATIONS

Oct. 6, 2011 Office Action issued in U.S. Appl. No. 12/312,224.
(Continued)

*Primary Examiner* — John Q Nguyen
*Assistant Examiner* — Kyung Kim
(74) *Attorney, Agent, or Firm* — Oliff PLC

(57) ABSTRACT

A travel control plan generating system 1 includes: upper level plan generating means 22*a* for generating an upper level plan corresponding to a travel policy of a vehicle A; lower level plan generating means 22*b* for generating a lower level plan, which is a plan for achieving the upper level plan and includes at least a travel course; lower level plan obtaining means 16, 30 for obtaining a lower level plan including at least a travel course of a peripheral vehicle B, C; evaluating means 24 for evaluating the lower level plan of the vehicle A in accordance with a predetermined index, taking into account the lower level plan of the peripheral vehicle B, C; and lower level plan selecting means 26 for selecting a lower level plan to be executed by the vehicle A on the basis of an evaluation performed by the evaluating means 24.

10 Claims, 8 Drawing Sheets

(51) Int. Cl.
*G08G 1/16* (2006.01)
*B60W 30/12* (2006.01)
*B60W 50/14* (2012.01)
*B60W 10/06* (2006.01)
*B60W 10/184* (2012.01)
*B60W 10/20* (2006.01)
*B60W 30/14* (2006.01)
*B60W 30/16* (2012.01)
*B60W 40/02* (2006.01)
*B60W 40/072* (2012.01)
*B60W 40/076* (2012.01)

(52) U.S. Cl.
CPC .............. *B60W 30/12* (2013.01); *B60W 30/143* (2013.01); *B60W 30/16* (2013.01); *B60W 40/02* (2013.01); *B60W 40/072* (2013.01); *B60W 40/076* (2013.01); *B60W 50/14* (2013.01); *B60W 2510/202* (2013.01); *B60W 2550/20* (2013.01); *B60W 2550/30* (2013.01); *B60W 2550/306* (2013.01); *B60W 2550/402* (2013.01)

(56) References Cited

U.S. PATENT DOCUMENTS

| | | | |
|---|---|---|---|
| 5,926,117 | A | 7/1999 | Gunji et al. |
| 6,026,347 | A | 2/2000 | Schuster |
| 6,122,572 | A | 9/2000 | Yavnai |
| 6,169,940 | B1 | 1/2001 | Jitsukata et al. |
| 6,185,499 | B1 | 2/2001 | Kinoshita et al. |
| 6,195,157 | B1 | 2/2001 | Yamashita et al. |
| 6,223,117 | B1 | 4/2001 | Labuhn et al. |
| 6,502,034 | B1 | 12/2002 | Miller |
| 6,807,482 | B2 * | 10/2004 | Utsumi ........................ 701/428 |
| 6,856,906 | B2 | 2/2005 | Winner et al. |
| 6,873,911 | B2 * | 3/2005 | Nishira et al. ................ 701/301 |
| 6,889,140 | B2 | 5/2005 | Isogai et al. |
| 7,069,146 | B2 | 6/2006 | Yamamura et al. |
| 7,961,084 | B2 | 6/2011 | Aso et al. |
| 2003/0187578 | A1 | 10/2003 | Nishira et al. |
| 2004/0030499 | A1 | 2/2004 | Knoop et al. |
| 2004/0193347 | A1 | 9/2004 | Harumoto et al. |
| 2005/0004723 | A1 | 1/2005 | Duggan et al. |
| 2005/0197770 | A1 | 9/2005 | Schiffmann et al. |
| 2005/0256630 | A1 | 11/2005 | Nishira et al. |
| 2005/0288844 | A1 | 12/2005 | Kimura et al. |
| 2006/0095193 | A1 | 5/2006 | Nishira et al. |
| 2007/0054685 | A1 | 3/2007 | Kellum |
| 2008/0167821 | A1 | 7/2008 | Breed |
| 2008/0189040 | A1 | 8/2008 | Nasu et al. |
| 2008/0243389 | A1 | 10/2008 | Inoue et al. |
| 2009/0192666 | A1 | 7/2009 | Trippler |
| 2009/0248284 | A1 | 10/2009 | Yoshioka et al. |
| 2009/0271050 | A1 | 10/2009 | Niki et al. |
| 2010/0045482 | A1 | 2/2010 | Strauss |
| 2010/0094509 | A1 | 4/2010 | Lüke et al. |
| 2010/0324775 | A1 | 12/2010 | Kermani et al. |
| 2011/0313664 | A1 | 12/2011 | Sakai et al. |

FOREIGN PATENT DOCUMENTS

| | | | |
|---|---|---|---|
| JP | A-03-118698 | | 5/1991 |
| JP | A-04-054600 | | 2/1992 |
| JP | A-7-56995 | | 3/1995 |
| JP | 10105895 | A * | 4/1998 |
| JP | A-10-207504 | | 8/1998 |
| JP | A-11-126294 | | 5/1999 |
| JP | A-11-144185 | | 5/1999 |
| JP | B1-2969174 | | 11/1999 |
| JP | A-11-345396 | | 12/1999 |
| JP | A-2000-137900 | | 5/2000 |
| JP | A-2000-207691 | | 7/2000 |
| JP | A-2000-242898 | | 9/2000 |
| JP | A-2001-301484 | | 10/2001 |
| JP | 2002-307972 | | 10/2002 |
| JP | A-2003-063430 | | 3/2003 |
| JP | A-2003-228800 | | 8/2003 |
| JP | A-2004-167666 | | 6/2004 |
| JP | A-2004-182149 | | 7/2004 |
| JP | A-2005-115637 | | 4/2005 |
| JP | A-2006-123795 | | 5/2006 |
| JP | A-2006-154967 | | 6/2006 |
| JP | A-2006-178673 | | 7/2006 |
| WO | WO 98/54629 | A1 | 12/1998 |
| WO | WO 2006/070865 | A1 | 7/2006 |

OTHER PUBLICATIONS

Oct. 11, 2011 Office Action issued in U.S. Appl. No. 12/312,001.
Goetz et al. "Advanced Driver Assistance Systems-Enhancement of Safety and Comfort;" *Auto Technology*; vol. 6; No. 6; 2006; pp. 34-38; Vieweg Verlag; Wiesbaden, Germany.
Extended European Search Report issued in European Application No. 07859692.1 dated May 9, 2011.
International Preliminary Report on Patentability for International Application No. PCT/JP2007/072885, filed Nov. 20, 2007 and issued on May 26, 2009.
Tsuneo Yoshikawa et al., "Hierarchical Robust Control for Robot Manipulators," Journal of the Robotics Society of Japan, 1990, pp. 563-572, vol. 8-No. 5.
Jun. 5, 2014 Office Action issued in U.S. Appl. No. 12/312,001.
Jun. 8, 2012 Office Action issued in U.S. Appl. No. 12/312,001.

* cited by examiner

# TRAVEL CONTROL PLAN GENERATION SYSTEM AND COMPUTER PROGRAM

TECHNICAL FIELD

The present invention relates to a travel control plan generating system and a computer program for generating a travel control plan for an automatically driven vehicle.

BACKGROUND ART

Japanese Unexamined Patent Application No. 2004-182149, for example, discloses an apparatus for controlling automatic driving of a vehicle. In this apparatus, a target deceleration is determined on the basis of a relative speed and a relative distance of a home vehicle to an obstacle ahead, and a braking force is controlled automatically such that an actual deceleration matches the target deceleration.

DISCLOSURE OF THE INVENTION

However, in the conventional apparatus described above, the control policy of the home vehicle is determined from the relative speed and relative distance to a peripheral vehicle, i.e. state parameters of the home vehicle at a certain moment, and therefore the home vehicle can only respond to variation in the conditions (acceleration/deceleration, lateral position, and so on) of the peripheral vehicle after the variation has actually occurred. As a result, so-called consequential control is performed. Hence, it is difficult to respond to condition variation with sufficient leeway and the response in such cases is limited, and therefore, depending on the response, control that contravenes the travel policy of the home vehicle in terms of comfort and fuel efficiency may be performed.

The present invention has been designed in consideration of the circumstances described above, and provides a travel control plan generating system and a computer program capable of responding flexibly to variation in the conditions of a peripheral environment while satisfying a travel policy of a home vehicle.

A travel control plan generating system according to the present invention includes: upper level plan generating means for generating an upper level plan corresponding to a travel policy of a vehicle; lower level plan generating means for generating a lower level plan, which is a plan for achieving the upper level plan and includes at least a travel course; lower level plan obtaining means for obtaining a lower level plan including at least a travel course of a peripheral vehicle of the vehicle; evaluating means for evaluating the lower level plan of the vehicle in accordance with a predetermined index, taking into account the lower level plan of the peripheral vehicle; and lower level plan selecting means for selecting a lower level plan to be executed by the vehicle on the basis of an evaluation performed by the evaluating means.

In this system, an upper level plan corresponding to the travel policy of the vehicle can be generated, and a lower level plan for achieving the upper level plan can be generated. The lower level plan includes at least a travel course, and the lower level plan of the vehicle can be evaluated taking into account the lower level plan of the peripheral vehicle, whereby the lower level plan to be executed can be selected in accordance with the evaluation. By stratifying a travel control plan into an upper level plan and a lower level plan in this manner, variation in the conditions of the peripheral environment can be responded to flexibly by means of the lower level plan while satisfying the travel policy by means of the upper level plan. Furthermore, the lower level plan can be selected on the basis of an evaluation performed in accordance with a predetermined index (for example, safety, comfort, environmental considerations (based on fuel efficiency and the like), and so on), and therefore the vehicle can be controlled on the basis of an appropriate plan corresponding to predetermined conditions.

The lower level plan generating means may generate a plurality of lower level plans for the vehicle, and the lower level plan selecting means may select the lower level plan to be executed from the plurality of lower level plans on the basis of the evaluation performed by the evaluating means. Thus, the vehicle can be controlled on the basis of an appropriate plan corresponding to predetermined conditions.

The upper level plan generating means may regenerate the upper level plan when the lower level plan cannot be generated. Further, the upper level plan generating means may regenerate the upper level plan in accordance with the evaluation performed by the evaluating means. Hence, when a lower level plan cannot be generated or the predetermined index cannot be satisfied sufficiently, the upper level plan can be reconsidered.

The lower level plan generating means may include inferring means for inferring the lower level plan of the peripheral vehicle on the basis of a behavior of the peripheral vehicle, and the lower level plan of the peripheral vehicle may be obtained from an inference by the inferring means. Thus, a lower level plan of a peripheral vehicle not having communicating means or a peripheral vehicle (for example, a manually driven vehicle) not having a travel control plan can be obtained.

The lower level plan obtaining means may include communicating means for communicating with the peripheral vehicle, and the lower level plan of the peripheral vehicle may be obtained through communication performed by the communicating means. Thus, the lower level plan of an automatically driven vehicle sewing as a peripheral vehicle having a travel control plan and the lower level plan of a peripheral vehicle of the automatically driven vehicle, which is inferred in the automatically driven vehicle, can be obtained through communication.

The evaluating means may evaluate the lower level plan of the vehicle taking into account a reliability of the lower level plan of the peripheral vehicle. The lower level plan of the peripheral vehicle is generated by an automatically driven vehicle and inferred in relation to a manually driven vehicle, and therefore the respective reliability levels of the lower level plans are different. Hence, by taking reliability into consideration while evaluating the lower level plan of the vehicle, the vehicle can be subjected to travel control on the basis of a more appropriate plan.

The reliability of a lower level plan obtained from the inferring means may be set lower than the reliability of a lower level plan of an automatically driven vehicle obtained from the communicating means. Thus, in a traffic environment where a manually driven vehicle and an automatically driven vehicle coexist, the vehicle can be subjected to travel control on the basis of a more appropriate plan.

The lower level plan may include a speed pattern of the vehicle. Thus, longitudinal direction control corresponding to the speed pattern can be set as a control target in addition to lateral direction control corresponding to the travel course.

A computer program according to the present invention causes a computer to execute: an upper level plan generating step for generating an upper level plan corresponding to a travel policy of a vehicle; a lower level plan generating step for generating a lower level plan, which is a plan for achieving the upper level plan and includes at least a travel course; a lower level plan obtaining step for obtaining a lower level plan including at least a travel course of a peripheral vehicle of the vehicle; an evaluating step for evaluating the lower level plan of the vehicle in accordance with a predetermined index, taking into account the lower level plan of the peripheral vehicle; and a lower level plan selecting step for selecting a lower level plan to be executed by the vehicle on the basis of an evaluation performed in the evaluating step. According to this computer program, the computer can be caused to function as a travel control plan generating system that can respond flexibly to variation in the conditions of a peripheral environment while satisfying a travel policy of a home vehicle.

BEST MODES FOR CARRYING OUT THE INVENTION

An embodiment of the present invention will be described below with reference to the attached drawings. Note that in the description of the drawings, identical elements have been allocated identical reference symbols and duplicate description thereof has been omitted.

Figure 1:
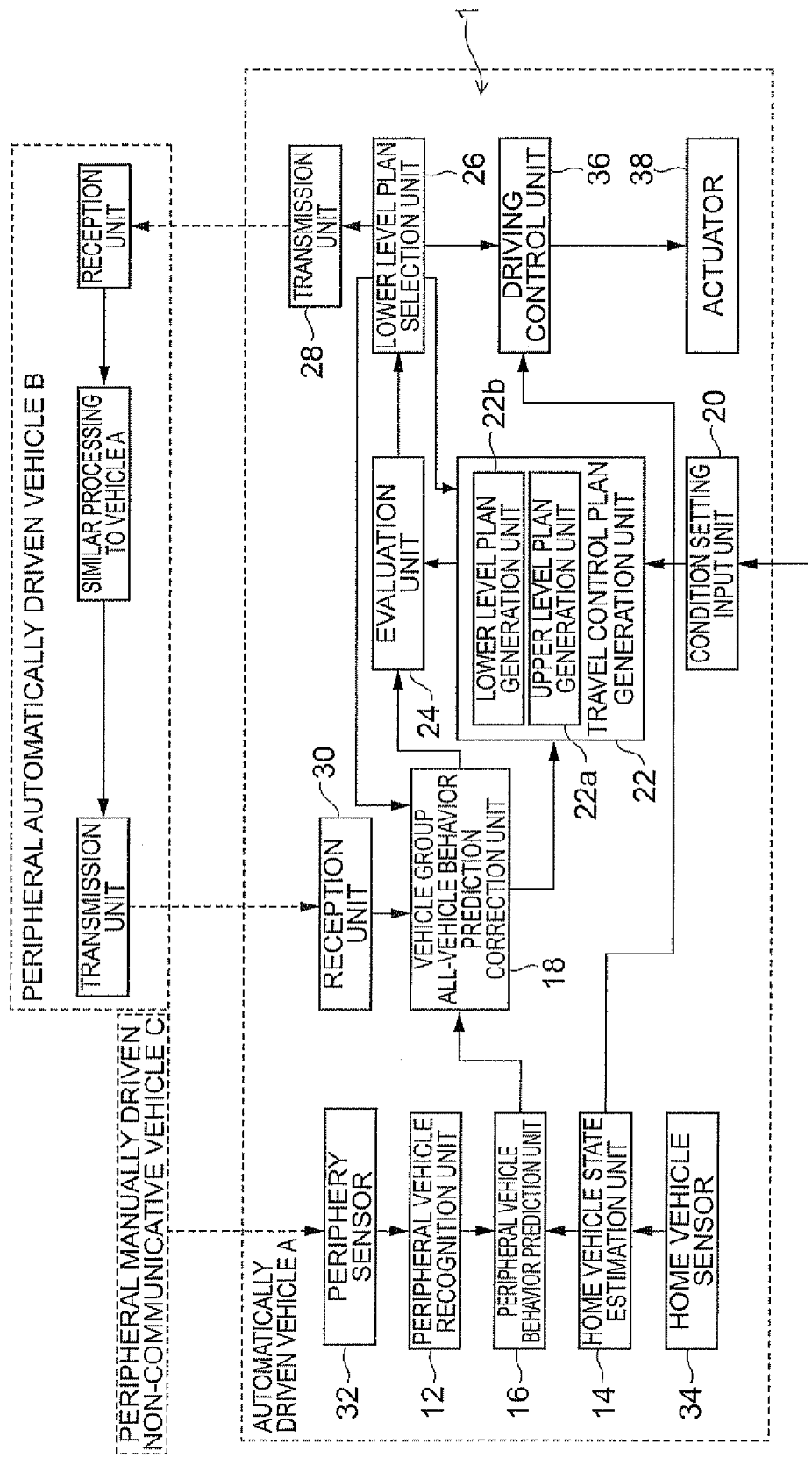
FIG. 1 is a block diagram showing the constitution of an automatically driven vehicle A installed with a travel control plan generating system according to an embodiment.

A travel control plan generating system (also referred to simply as a "generating system" hereafter) according to this embodiment is formed using hardware of a microcomputer such as an ECU (Electronic Control Unit) and software, and is installed in an automatically driven and controlled vehicle A. As shown in FIG. 1, the generating system 1 includes a peripheral vehicle recognition unit 12, a home vehicle state quantity estimation unit 14, a peripheral vehicle behavior prediction unit (lower level plan obtaining means, inferring means) 16, a vehicle group all-vehicle behavior prediction correction unit 18, a condition setting input unit 20, a travel control plan generation unit (upper level plan generating means, lower level plan generating means) 22, an evaluation unit (evaluating means) 24, a lower level plan selection unit (lower level plan selecting means) 26, a transmission unit 28, and a reception unit (lower level plan obtaining means, communicating means) 30.

The peripheral vehicle recognition unit 12 is connected to a periphery sensor 32 that performs peripheral monitoring, such as a millimeter wave radar, an image sensor, a laser radar, or an ultrasonic wave sensor. The peripheral vehicle recognition unit 12 recognizes a peripheral vehicle C (here, a non-communicative vehicle C that is driven manually and does not have a, communication function) existing on the periphery of the vehicle A (also referred to as a home vehicle) on the basis of a detection value (reflection information from a peripheral object such as a vehicle, for example) from the periphery sensor 32, and calculates peripheral vehicle information such as a relative distance, a relative speed, and a relative angle from the home vehicle A.

The home vehicle state estimation unit 14 is connected to a home vehicle sensor 34 that detects a home vehicle's state. Examples of the home vehicle sensor 34 include a yaw rate sensor, a vehicle speed sensor an acceleration sensor, a steering angle sensor, a white line detection sensor, and a GPS. On the basis of a detection value from the home vehicle sensor 34, the home vehicle state estimation unit 14 calculates a state estimated value (a yaw rate, a lateral position within a lane, a lateral velocity, a yaw angle relative to a road shape, a home vehicle position, and so on) of the vehicle A at a corresponding point in time using a vehicle model incorporated into the software.

The peripheral vehicle behavior prediction unit 16 obtains the peripheral vehicle information calculated by the peripheral vehicle recognition unit 12 and the state estimation value of the vehicle A calculated by the home vehicle state estimation unit 14. From the obtained information, the peripheral vehicle behavior prediction unit 16 calculates a position information history of the vehicle A, a relative position information history and a relative speed of the peripheral vehicle C, and so on, and estimates the position information history and current conditions (speed, acceleration, yaw angle relative to the road alignment, and so on) of the peripheral vehicle C from this information. Thus, the positional relationships of the peripheral vehicle C and the tendencies of the peripheral vehicle C (driver preferences such as inter-vehicle distance, vehicle speed, acceleration, and willingness to change lanes) can be estimated. The peripheral vehicle behavior prediction unit 16 also obtains traveling road information (lane number increases/decreases, convergence, forks, shape, curbs, and so on) from a navigation system, infrastructure facilities, and so on. Then, on the basis of the position information history and current conditions of the peripheral vehicle C and the road information, the peripheral vehicle behavior prediction unit 16 tentatively predicts the future (for example, within approximately several hundred meters) behavior (including a travel course and a speed pattern) of the peripheral vehicle C as a lower level plan of the peripheral vehicle C from the tendencies of the peripheral vehicle C and in accordance with a driver model generated in advance.

The reception unit 30 obtains a travel control plan for another automatically driven vehicle B, which is generated by the vehicle B, through inter-vehicle communication using radio waves of 2.4 GHz or the like. The travel control plan includes a similar upper level plan, to be described below, to that of the vehicle A, and a lower level plan including a travel course and a speed pattern.

The vehicle group all-vehicle behavior prediction correction unit 18 obtains the lower level plan of the vehicle A, which is selected by the lower level plan selection unit 26, and also obtains the lower level plan of the vehicle B from the reception unit 30 and the behavior prediction (lower level plan) of the vehicle C from the peripheral vehicle behavior prediction unit 16. The vehicle group all-vehicle behavior prediction correction unit 18 then corrects the lower level plans of the respective vehicles such that mismatch points (when two vehicles overlap or the like) are eliminated by overlapping the plans on a temporal axis.

The condition setting input unit 20 receives input of overall travel conditions to a destination specified by the driver, for example the destination) desired travel time, fuel efficiency precedence, rest plans, and so on.

The travel control plan generation unit 22 includes an upper level plan generation unit (upper level plan generating means) 22a and a lower level plan generation unit (lower level plan generating means) 22b. The upper level plan generation unit 22a dynamically generates a travel plan in units of several tens of km and several tens of minutes extending between interchanges IC or service areas/parking areas SAPA, taking into consideration overall travel conditions, which are set in units of several hundred km and several hours to the destination specified by the driver, travel environment conditions such as navigation information and infrastructure information, and so on. The travel plan includes the travel time, travel plan policies (rest frequency, fuel efficiency, other vehicle precedence, and so on), vehicle group organization, and so on.

More specifically, a route search to the destination is performed, and a plurality of candidate routes is selected. An optimum route satisfying traffic information, the desired travel time, and the travel plan policies is then selected. The entire route is then divided into units of ICs or SAPAs, and a travel plan is determined for each section. If necessary, a vehicle group organization policy plan is also determined as a travel plan. In a vehicle group organization policy plan, a plurality of automatically driven vehicles are organized into a vehicle group such that starts and stops can be performed en masse, thereby reducing repeated unnecessary starts and stops during travel through congestion, for example.

Further, the upper level plan generation unit 22a dynamically generates an event transition plan in units of several hundred meters and several tens of seconds from each point in time on the basis of the travel plan generated as described above, recognition of the peripheral conditions (based on the periphery sensor 32, infrastructure monitoring information, etc.), and so on. The event transition plan includes a lane change (a completion target point, a desired lane change time (degree of urgency), a minimum allowable lane change time (during emergency avoidance or the like), whether the lane change is necessary or required for emergency avoidance, the probability of returning to the original lane, and so on), an upper limit speed modification (a new upper limit speed, a completion target point, a desired acceleration G, a desired deceleration G, a desired jerk, an allowable jerk, whether or not the required speed has been reached, and so on), an inter-vehicle distance, convergence (a desired convergence point, a desired convergence speed, a desired convergence operation time (degree of urgency), and so on), diversion (similar to convergence), organization of a rank, withdrawal from the rank, and so on. Note that the content of the parentheses indicates relevant setting conditions when an instruction is issued to the lower level plan generation unit 22b. For example, when an instruction is issued to the vehicles as a travel plan to cooperate with their surrounding vehicles together with a congestion vehicle group control instruction, an event transition such as a lane change or an upper limit speed modification is planned in order to achieve the travel plan.

To realize the event transition plan generated by the upper level plan generation unit 22a, the lower level plan generation unit 22b dynamically generates a lower level plan including a target travel course and a target speed pattern in units of several centimeters and several tens of milliseconds from each point in time over several hundred meters on the basis of the road information.

Figure 2:
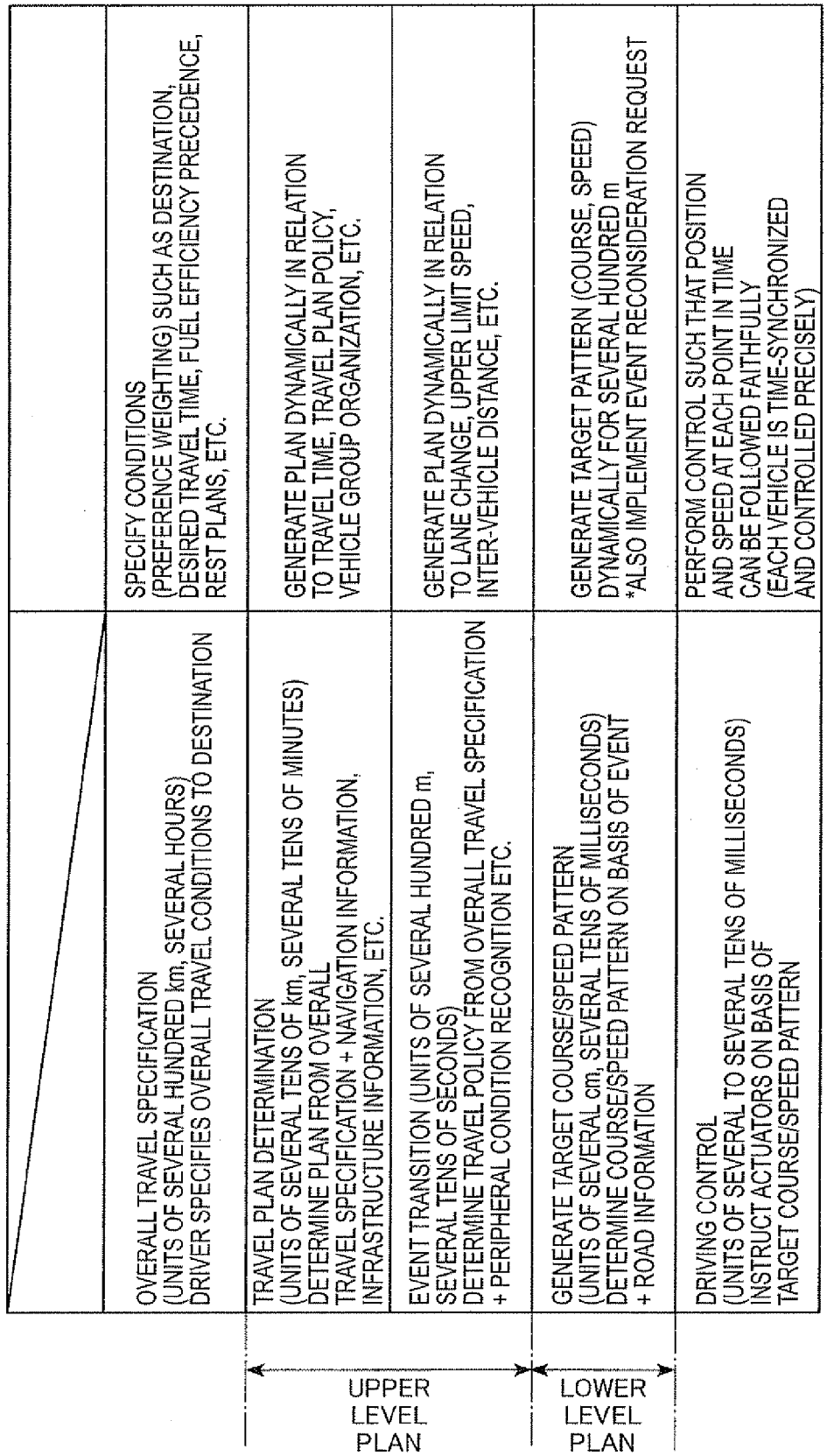
FIG. 2 is a view showing a flow of multi-layer travel control plan generation.

Referring to FIG. 2, the lower level plan generated by the lower level plan generation unit 22b in this manner is used to realize the upper level event transition plan generated by the upper level plan generation unit 22a, while the event transition plan is used to realize the upper level travel plan. The travel plan corresponds to the travel policies specified by the driver. Hence, travel control plan generation is divided into multiple layers, i.e. the upper level plan and the lower level plan, and the upper level plan itself is divided into multiple layers, i.e. the travel plan and the event transition plan. As the level of the plan decreases, the time scale thereof becomes smaller than that of the upper level plan. By dividing travel control plan generation into multiple layers in this manner, a request for reconsideration of the event transition plan can be issued when a lower level plan cannot be generated by the lower level plan generation unit 22b, and as a result, the upper level plan can be regenerated.

Note that in the travel control plan generation unit 22, the corrected lower level plans of the vehicle B and the vehicle A and the corrected behavior prediction of the vehicle C are input from the vehicle group all-vehicle behavior prediction correction unit 18, and the lower level plan is generated on the basis of this input. At this time, a travel plan and an event transition plan serving as the upper level plans of the vehicle B may be obtained by the travel control plan generation unit 22 from the vehicle group all-vehicle behavior prediction correction unit 18, and the travel plan and event transition plan of the home vehicle A may be generated on the basis of the obtained plans.

The evaluation unit 24 evaluates each of a plurality of tentatively generated lower level plans of the vehicle A on the basis of a predetermined index (for example, safety, comfort, environmental considerations (based on fuel efficiency etc.), and so on), taking into consideration the behavior prediction of the peripheral vehicle C and the lower level plan of the automatically driven vehicle B obtained from the vehicle group all-vehicle behavior prediction correction unit 18. Safety can be evaluated from the inter-vehicle distance, the steering urgency, and so on. Comfort can be evaluated from a maximum lateral G, an average lateral G, the yaw rate, and so on. As regards environmental considerations, the fuel efficiency can be evaluated from an anticipated fuel consumption and consideration to other vehicles can be evaluated from the other vehicle precedence. When the evaluation performed by the evaluation unit 24 indicates a problem such as an inability to ensure safety, the problem is corrected in the travel control plan generation unit 22, whereupon a new evaluation is performed by the evaluation unit 24. When the problem cannot be corrected, a request to reconsider the event transition plan is issued, whereby the upper level plan is regenerated.

In the evaluation performed by the evaluation unit 24, the reliability of the lower level plans is taken into account. For example, the lower level plan generated by the automatically driven vehicle B and the lower level plan inferred in relation to the manually driven vehicle C differ in terms of reliability, and therefore the lower level plans are evaluated taking the reliability thereof into account. More specifically, the reliability of the lower level plan obtained from the prediction performed by the peripheral vehicle behavior prediction unit 16 is set to be lower than the reliability of the lower level plan of the automatically driven vehicle B obtained by the reception unit 30. Hence, the inter-vehicle distance can be reduced further in relation to the automatically driven vehicle B than in relation to the manually driven vehicle C, for example.

On the basis of the evaluation results of the evaluation unit 24, the lower level plan selection unit 26 selects the lower level plan having the best evaluation from among a plurality of lower level plans as the travel control plan to be executed. For example, when safety is emphasized, the lower level plan with which the highest level of safety can be secured is selected as the travel control plan to be executed. Note that in the case described above, reliability is taken into account during the evaluation performed by the evaluation unit 24, but reliability may also be taken into account during the selection made by the lower level plan selection unit 26. In other words, an evaluation score output by the evaluation unit 24 may be multiplied by the reliability and thereby corrected, and the selection may be made on the basis of the corrected evaluation score.

On the basis of the selected lower level plan (including the travel course and speed pattern), a driving control unit 36 generates an instruction value in relation to an actuator 38, taking into account the estimated value of the home vehicle's state, such that a position and a speed at each point in time can be reproduced faithfully.

The actuator 38 is constituted by actuators of an engine, a brake, an electric power steering, and so on, and an ECU for controlling these actuators, and drive-controls these components upon reception of a throttle opening instruction value, a brake pressure instruction value, a steering torque instruction value, and so on from the driving control unit 36.

The transmission unit 28 transmits the lower level plan of the vehicle A, selected by the lower level plan selection unit 26, to the other automatically driven vehicle B through inter-vehicle communication using radio waves of 2.4 GHz or the like. At this time, the upper level plan of the vehicle A may also be transmitted.

Figure 3:
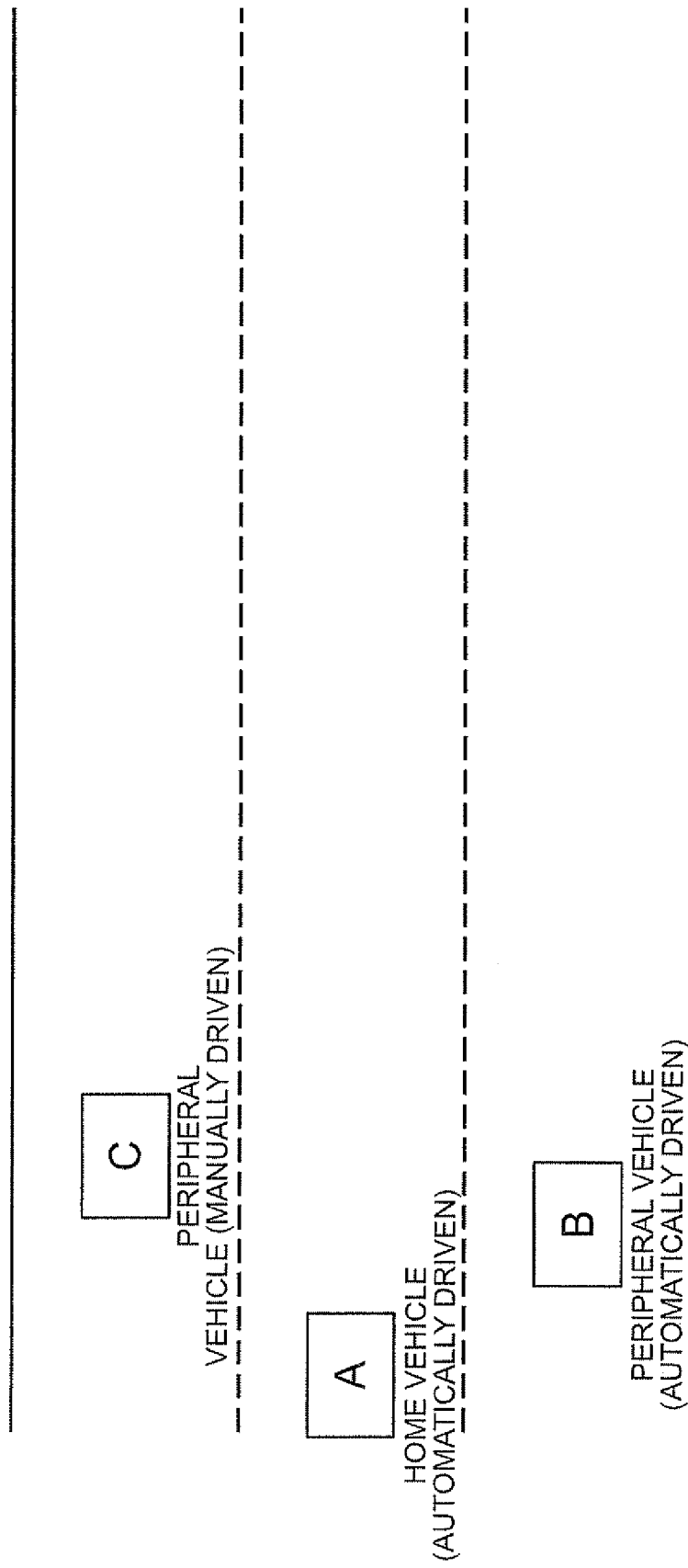
FIG. 3 is a view showing positional relationships between a vehicle A and peripheral vehicles B, C.

Next, driving control of the automatically driven vehicle A installed with the travel control plan generating system 1 will be described. Here, as shown in FIG. 3, a case in which the automatically driven vehicle A is subjected to driving control in a traffic environment where the manually driven vehicle C and the automatically driven vehicle B exist as peripheral vehicles will be described.

First, the peripheral vehicle C existing on the periphery of the home vehicle A is recognized in the peripheral vehicle recognition unit 12 on the basis of a detection value from the periphery sensor 32, whereupon peripheral vehicle information such as the relative distance, angle and speed to the home vehicle A is calculated. Then, on the basis of a detection value from the home vehicle sensor 34, a state estimated value of the home vehicle A (the home vehicle position, yaw rate, lateral position within the lane, lateral velocity, yaw angle relative to road shape, and so on) at the corresponding point in time is calculated in the home vehicle state estimation unit 14.

Next, the peripheral vehicle information calculated by the peripheral vehicle recognition unit 12 and the state estimated value of the vehicle A calculated by the home vehicle state estimation unit 14 are obtained in the peripheral vehicle behavior prediction unit 16. The position information history of the vehicle A, the relative position information history and relative speed of the peripheral vehicle C, and so on are then calculated from the obtained information, and from this information, the position information history and current conditions (speed, acceleration, yaw angle relative to road shape, and so on) of the peripheral vehicle C are estimated. Thus, the positional relationships and tendencies of the peripheral vehicle C (driver preferences such as inter-vehicle distance, vehicle speed, acceleration/deceleration, and willingness to change lanes) can be estimated. The peripheral vehicle behavior prediction unit 16 also obtains traveling road information (lane number increases/decreases, convergence, forks, shape, curbs, and so on) from the navigation system, infrastructure facilities, and so on. Then, on the basis of the position information history and current conditions of the peripheral vehicle C and the road information, the peripheral vehicle behavior prediction unit 16 tentatively predicts the future (for example, within approximately several hundred meters) behavior (including the travel course and speed pattern) of the peripheral vehicle C from the tendencies of the peripheral vehicle C and in accordance with a driver model generated in advance. At this time, the behavior prediction of the peripheral vehicle C is generated together with a reliability value. The reliability value is set at a predetermined value, which is lower than the reliability of the lower level plan of the automatically driven vehicle B.

Next, the vehicle group all-vehicle behavior prediction correction unit 18 obtains the lower level plan of the vehicle A selected by the lower level plan selection unit 26, and also obtains the lower level plan of the vehicle B from the reception unit 30 and the behavior prediction of the vehicle C from the peripheral vehicle behavior prediction unit 16. The vehicle group all-vehicle behavior prediction correction unit 18 then corrects the lower level plans of the respective vehicles such that mismatch points (when two vehicles overlap or the like) are eliminated by overlapping the plans on a temporal axis.

Figure 4:
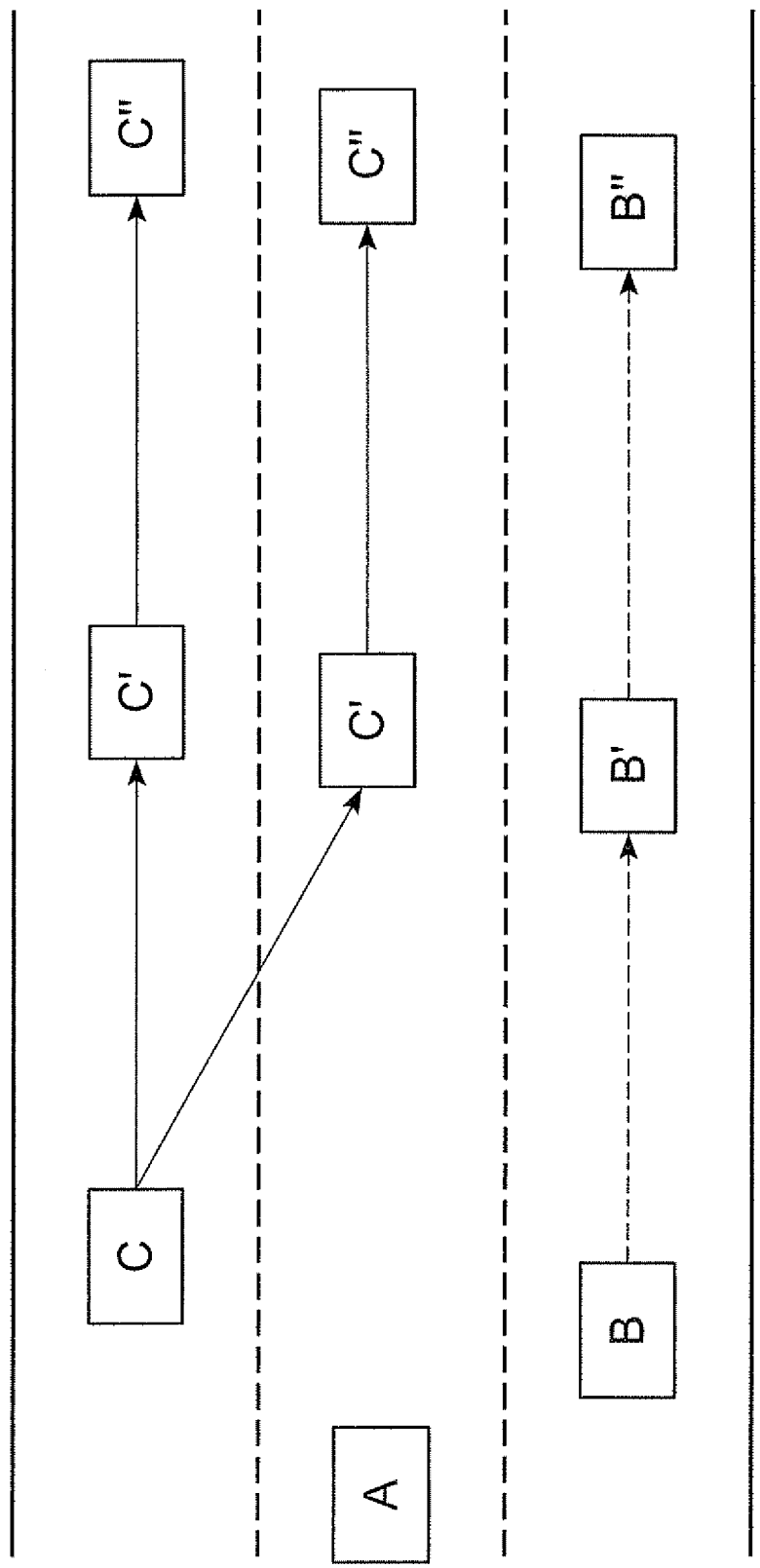
FIG. 4 is a view showing a lower level plan of the peripheral vehicle B and a behavior prediction (lower level plan) of the vehicle C.

Thus, the lower level plans of the vehicles B and C serving as peripheral vehicles can be obtained, as shown in FIG. 4. Here, C', C" denote the position of the vehicle C at intervals of several tens of milliseconds, for example (likewise in relation to the vehicle B).

Meanwhile, the condition setting input unit 20 receives input of the overall travel conditions to the destination specified by the driver, for example the destination, desired travel time, fuel efficiency precedence, rest plans, and so on.

Next, the upper level plan generation unit 22a dynamically generates a travel plan in units of several tens of km and several tens of minutes extending between interchanges IC or service areas/parking areas SAPA, taking into consideration the overall travel conditions, which are set in units of several hundred km and several hours to the destination specified by the driver, travel environment conditions such as the navigation information and infrastructure information, and so on.

More specifically, a route search to the destination is performed, and a plurality of candidate routes is selected. An optimum route satisfying the traffic information, the desired travel time, and the travel plan policies is then selected. The entire route is then divided into units of ICs or SAPAs, and a travel plan is determined for each section. If necessary, a vehicle group organization policy plan is also determined as a travel plan.

Further, the upper level plan generation unit 22a dynamically generates an event transition plan in units of several hundred meters and several tens of seconds from each point in time on the basis of the travel plan generated as described above, recognition of the peripheral conditions, and so on.

Next, in order to realize the event transition plan generated by the upper level plan generation unit 22a, the lower level plan generation unit 22b dynamically generates a lower level plan including a target travel course and a target speed pattern in units of several centimeters and several tens of milliseconds from each point in time over several hundred meters on the basis of the road information. At this time, a plurality of lower level plans may be generated using an identical course generation method, or the plurality of lower level plans may be generated using various course generation methods. Furthermore, when the corresponding event transition is not necessary, a plurality of lower level plans may be generated for each of a case in which the event is performed and a case in which the event is not performed.

When the lower level plan cannot be generated by the lower level plan generation unit 22b, a request for reconsideration of the event transition plan is issued, and as a result, the upper level plan is regenerated. A lower level plan for realizing the new upper level plan is then generated.

Figure 5:
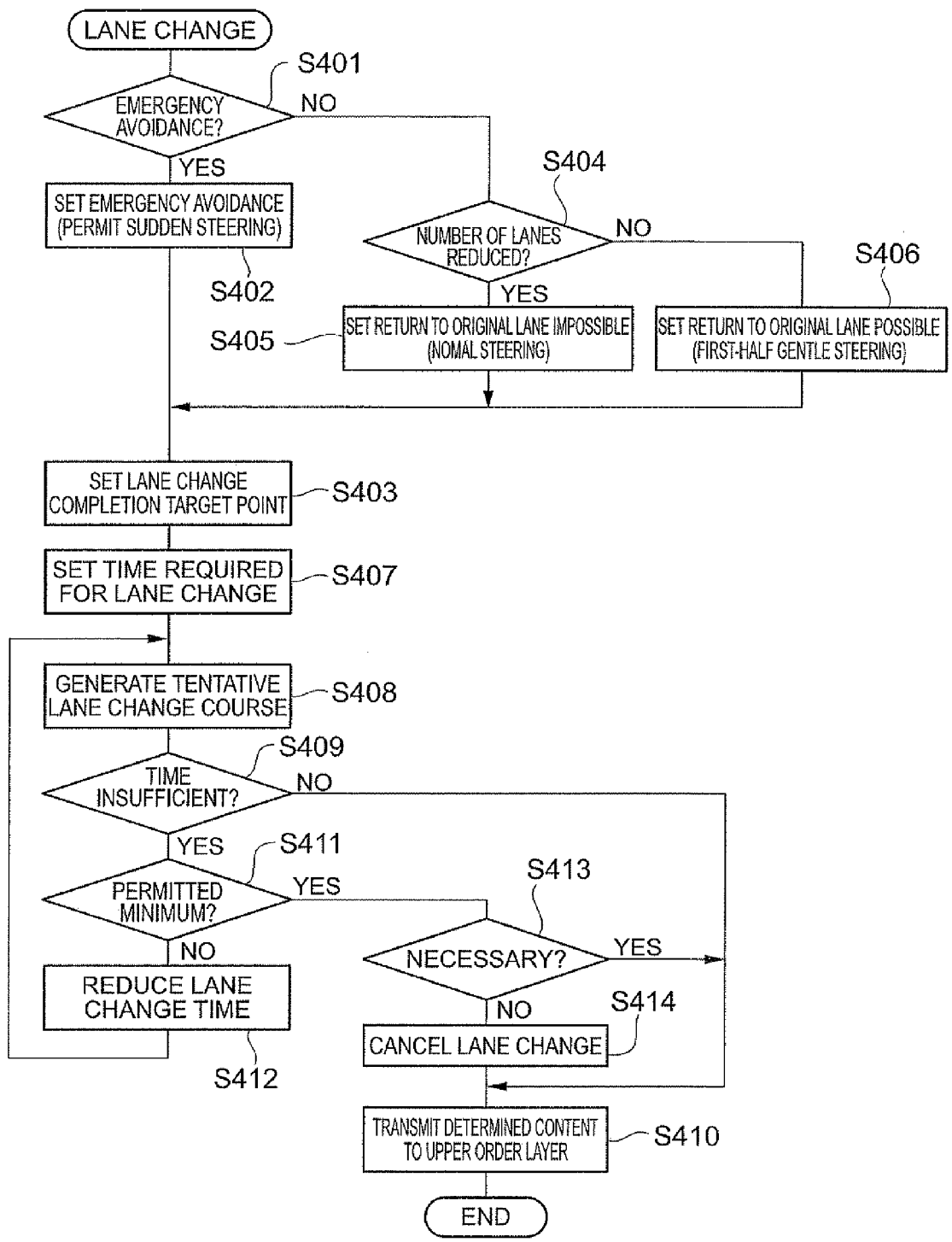
FIG. 5 is a flowchart of lower level plan generation when a lane change is planned.

More specifically, as shown in FIG. 5, when a lane change is planned as the upper level plan, for example, first, a determination is made in the lower level plan generation unit 22b as to whether or not emergency avoidance is required (step S401). When emergency avoidance is required, emergency avoidance setting, such as permitting sudden steering, is performed, whereupon the procedure advances to a step S403. When emergency avoidance is not required, on the other hand, a determination is made as to whether or not the number of lanes is about to decrease (step S404). When the number of lanes is about to decrease, setting indicating that the original lane cannot be returned to through normal steering is performed (step S405), whereupon the procedure advances to the step S403. When the number of lanes is not about to decrease, on the other hand, setting indicating that the original lane can be returned to through first-half gentle steering is performed (step S406), whereupon the procedure advances to the step S403.

In the step S403, a completion target point of the lane change is set, and in a following step S407, a time required to perform the lane change is set. On the basis of the set information, a lane change course is then tentatively generated (step S408). Next, a determination is made as to whether or not sufficient time is available to perform the lane change (step S409). When sufficient time is available, the procedure advances to a step S410. When sufficient time is not available, on the other hand, a determination is made as to whether or not the available time is a minimum allowable time (step S411). When the available time is not the minimum allowable time and some leeway exists, the time required to perform the lane change is shortened (step S412), whereupon the procedure returns to the step S408. When the available time is the minimum allowable time, on the other hand, a determination is made in a step S413 as to whether or not the lane change is necessary, and when the lane change is necessary, the procedure advances to the step S410. When the lane change is not necessary, a determination is made in a step S414 to cancel the lane change, whereupon the procedure advances to the step S410. In the step S410, the determined content is transmitted to an upper order layer. Accordingly, a determination to perform the lane change along the course generated when the available time is sufficient, a determination to perform the lane change along the course generated when the available time is insufficient but corresponds to the minimum allowable time and the lane change is necessary, or a determination to cancel the lane change when the available time is insufficient and corresponds to the minimum allowable time and the lane change is not necessary, is transmitted to the upper order layer When the lane change is canceled, a new event transition plan not including a lane change is generated, and a lower level plan for realizing the new event transition plan is generated.

Next, the evaluation unit 24 evaluates each of the plurality of tentatively generated lower level plans of the vehicle A on the basis of the predetermined index (for example, safety, comfort, environmental considerations (based on fuel efficiency etc.), and so on), taking into consideration the behavior prediction of the peripheral vehicle C and the lower level plan of the automatically driven vehicle B obtained from the vehicle group all-vehicle behavior prediction correction unit 18. When the evaluation performed by the evaluation unit 24 indicates a problem such as an inability to ensure safety, the problem is corrected in the travel control plan generation unit 22, whereupon a new evaluation is performed by the evaluation unit 24. When the problem cannot be corrected, a request to reconsider the event transition plan is issued, whereby the upper level plan is regenerated.

In the evaluation performed by the evaluation unit 24, the reliability of the lower level plans is taken into account. For example, the lower level plan generated by the automatically driven vehicle B and the lower level plan inferred in relation to the manually driven vehicle C differ in reliability, and therefore the lower level plans are evaluated taking the reliability thereof into account. More specifically, the reliability of the lower level plan obtained from the prediction performed by the peripheral vehicle behavior prediction unit 16 is set to be lower than the reliability of the lower level plan of the automatically driven vehicle B obtained by the reception unit 30. Thus, the inter-vehicle distance can be reduced further in relation to the automatically driven vehicle B than in relation to the manually driven vehicle C, for example.

On the basis of the evaluation results of the evaluation unit 24, the lower level plan selection unit 26 selects the lower level plan having the best evaluation from among the plurality of lower level plans as the travel control plan to be executed. For example, when safety is emphasized, the lower level plan with which the highest level of safety can be secured is selected as the travel control plan to be executed.

Figure 6:
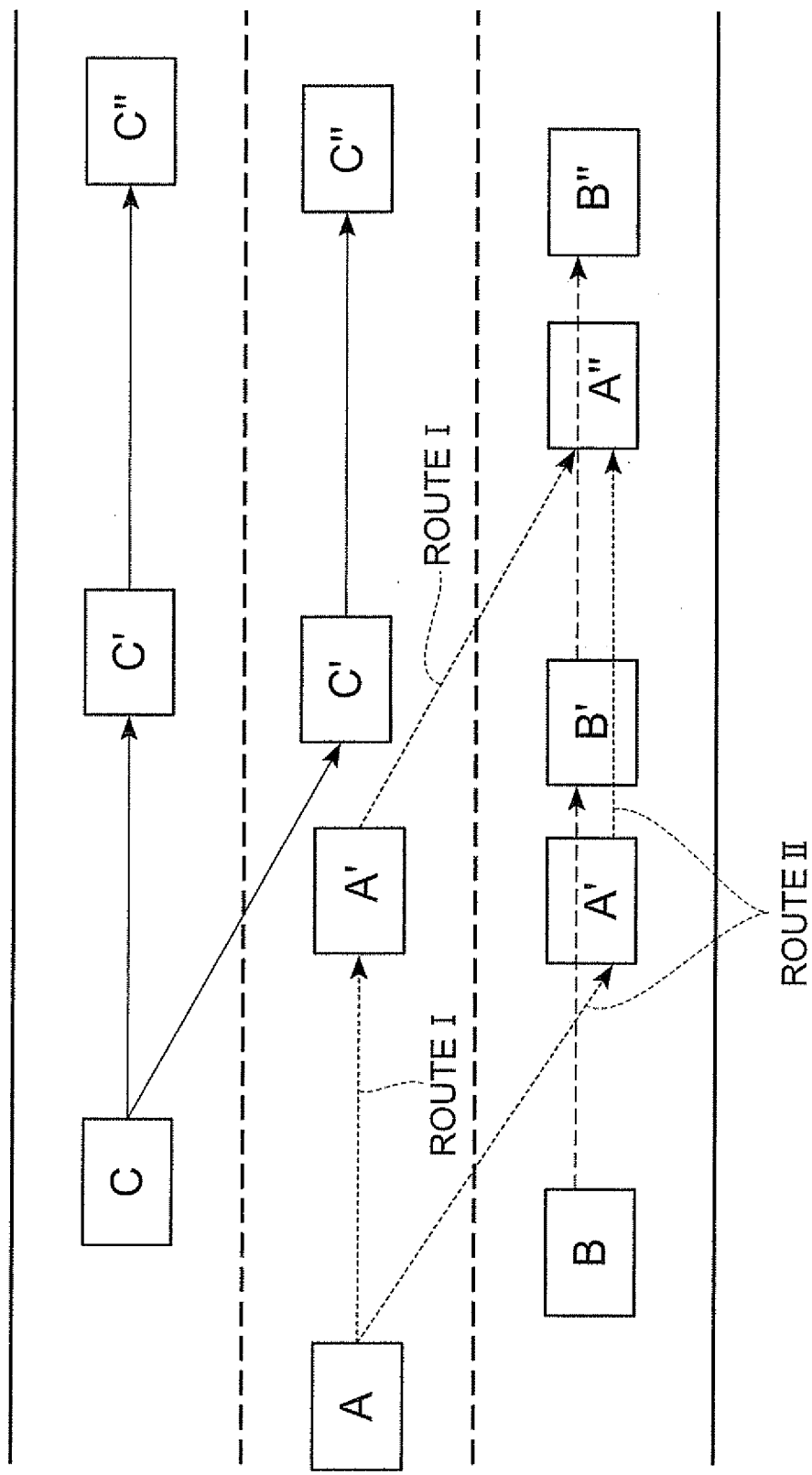
FIG. 6 is a view illustrating evaluation and selection of a lower level plan of the vehicle A.

FIG. 6 is a view illustrating evaluation and selection of the lower level plan of the vehicle A. As shown in FIG. 6, it is assumed that a lane change is planned as the upper level plan, and that a route I and a route II have been generated as the lower level plans. At this time, the 25 reliability of the lower level plan of the automatically driven vehicle B is higher than the reliability of the lower level plan of the manually driven vehicle C, and therefore the route II is evaluated as having a higher level of safety. Hence, when safety is to be emphasized, the lower level plan selection unit 26 selects the route II having the higher level of safety as the lower level plan of the vehicle A.

Next, on the basis of the selected lower level plan (including the travel course and speed pattern), the driving control unit 36 generates an instruction value in relation to the actuator 38, taking into account the estimated value of the home vehicle state of quantity, such that the position and speed at each point in time can be reproduced faithfully.

The actuator 38 then drive-controls the engine, the brake, the steering, and so on upon reception of a throttle opening instruction value, a brake pressure instruction value, a steering torque instruction value, and so on from the driving control unit 36, whereby the vehicle A is subjected to automatic driving control.

Meanwhile, the transmission unit 28 transmits the lower level plan of the vehicle A, selected by the lower level plan selection unit 26, to the other automatically driven vehicle B. At this time, the upper level plan of the vehicle A may also be transmitted.

Hence, in the travel control plan generating system 1 according to this embodiment, an upper level plan corresponding to the travel policy of the vehicle A can be generated, and a lower level plan for realizing the upper level plan can be generated. As the level of the plan decreases, the time scale thereof becomes smaller than that of the upper level plan. The lower level plan includes at least a travel course, and the lower level plan of the vehicle A is evaluated in consideration of the lower level plans of the peripheral vehicles B, C. A lower level plan to be executed can then be selected in accordance with the evaluation. By stratifying the travel control plan into an upper level plan and a lower level plan in this manner, variation in the conditions of the peripheral environment can be responded to flexibly by means of the lower level plan while satisfying the travel policy by means of the upper level plan. Furthermore, the lower level plan can be selected on the basis of an evaluation performed in accordance with a predetermined index (for example, safety, comfort, environmental considerations (based on fuel efficiency etc.), and so on), and therefore the vehicle A can be controlled on the basis of an appropriate plan corresponding to conditions specified by the driver. In other words, by evaluating and selecting lower level plans that have been broken down into a smaller time scale than the upper level plan, realization of the upper level plan and a flexible response to the peripheral environment can both be realized favorably.

In other words, in the vehicle control according to this embodiment, in contrast to IMTS (Intelligent Multimode Transit System, reserved road travel), a single plan is not shared by a plurality of vehicles. On a reserved road, the travel road is fixed, and therefore an optimum plan can be generated by adjusting all of the plans in advance. On a normal road, however, the travel road is used for a wide range of purposes, peripheral vehicles are unknown, and each vehicle travels in accordance with its own plan. Therefore, a plan that takes into consideration the plans of the peripheral vehicles must be devised to ensure that the vehicles operate harmoniously, and since it is substantially impossible to travel in accordance with a preset optimum plan, the plan must be adjusted dynamically in accordance with the peripheral vehicles. In this embodiment, travel control plan generation is performed in a multi-layer fashion, and therefore a lower level plan can be generated flexibly in accordance with the peripheral vehicles while realizing the absolute upper level plan. Hence, optimum vehicle control can be performed.

Further, a plurality of lower level plans is generated in relation to the vehicle A, and on the basis of the evaluation performed by the evaluation unit 24, a lower level plan to be executed is selected from the plurality of lower level plans. Therefore, the vehicle A can be controlled on the basis of an appropriate plan corresponding to the conditions specified by the driver.

Further, when a lower level plan cannot be generated, the upper level plan is regenerated, or the upper level plan is regenerated in accordance with the evaluation performed by the evaluation unit 24, and therefore the upper level plan can be reconsidered when a lower level plan cannot be generated or the predetermined index specified by the driver cannot be satisfied sufficiently.

Further, the peripheral vehicle behavior prediction unit 16 infers the lower level plan of the peripheral vehicle on the basis of the behavior of the peripheral vehicle, and therefore, a lower level plan can be obtained in relation to a peripheral vehicle that does not include communication means or the peripheral vehicle (for example, a manually driven vehicle) C that does not have a travel control plan. Furthermore, the lower level plan of the peripheral vehicle can be obtained by the reception unit 30, and therefore the lower level plan of the automatically driven vehicle B, which is a peripheral vehicle having a travel control plan, and the lower level plan of a peripheral vehicle of the automatically driven vehicle B, which is inferred in the automatically driven vehicle B, can be obtained through communication. Hence, in a traffic environment where manually driven vehicles and automatically driven vehicles coexist, the vehicle A can be subjected to travel control on the basis of a more appropriate plan.

Further, the evaluation unit 24 evaluates the lower level plan of the vehicle A taking into consideration the reliability of the lower level plans of the peripheral vehicles. Here, a lower level plan is generated by the automatically driven vehicle B and inferred in relation to the manually driven vehicle C, and therefore the reliability levels of the respective lower level plans of the peripheral vehicles are different. Therefore, by taking the reliability into account while evaluating the lower level plan of the vehicle A, the vehicle A can be subjected to travel control on the basis of a more appropriate plan.

Further, the reliability of the lower level plan obtained from the prediction made by the peripheral vehicle behavior prediction unit 16 is lower than the reliability of the lower level plan of the automatically driven vehicle B obtained by the communication unit 30, and therefore, by performing the evaluation on the basis of the reliability, the vehicle A can be subjected to travel control on the basis of a more appropriate plan in a traffic environment where the manually driven vehicle C and the automatically driven vehicle B coexist.

Furthermore, the lower level plan includes a speed pattern in addition to the travel course of the vehicle A, and therefore longitudinal direction control corresponding to the speed pattern can be set as a control target in addition to lateral direction control corresponding to the travel course.

Note that the present invention is not limited to the embodiment described above, and may be subjected to various modifications. For example, in the embodiment described above, a traffic environment in which the automatically driven vehicle B and the manually driven non-communicative vehicle C coexist as the peripheral vehicles of the automatically driven vehicle A was described, but other automatically driven vehicles and manually driven non-communicative vehicles may also exist.

Figure 7:
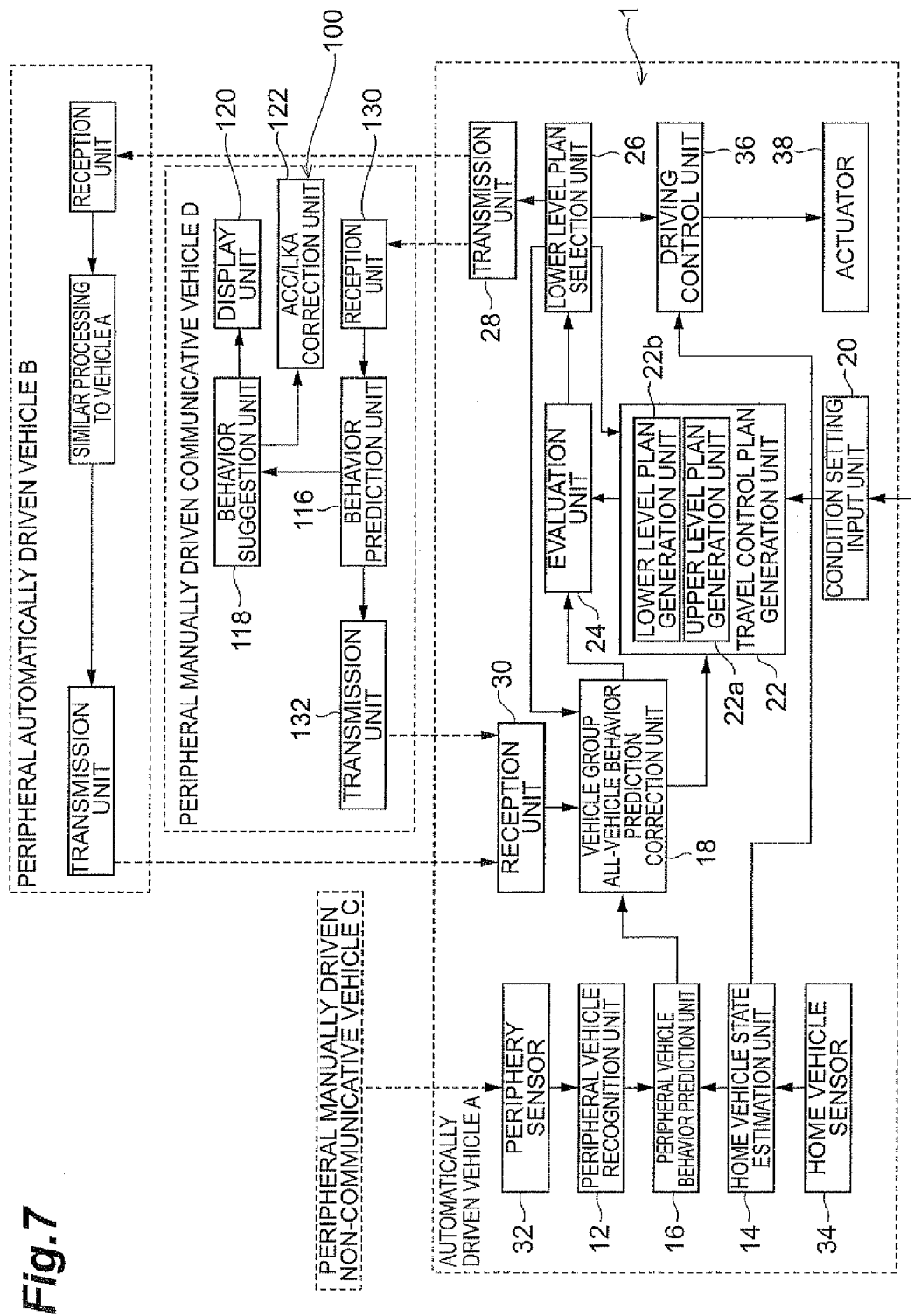
FIG. 7 is a block diagram showing a modified example of the constitution of the automatically driven vehicle A installed with the travel control plan generating system.

Further, as shown in FIG. 7, a vehicle D that is manually driven but capable of communication may exist as a peripheral vehicle. As shown in FIG. 7, the vehicle D includes a driving support control apparatus 100. The driving support control apparatus 100 includes a behavior prediction unit 116, a behavior suggestion unit 118, a display unit 120, an ACC/LKA correction unit 122, a reception unit 130, and a transmission unit 132.

The reception unit 130 receives the lower level plans of the vehicles A, B and the behavior prediction for the vehicle C, which is predicted in the vehicle A. The behavior prediction unit 116 predicts the behavior of the vehicle D from vehicle-installed sensor information relating to a vehicle speed sensor, an accelerator pedal sensor, a brake sensor, a steering angle sensor, and so on of the vehicle D, the behavior prediction result generated by the vehicle A in relation to the vehicle C, which is obtained via the reception unit 130, and the lower level plans of the vehicles A, B. At this time, the reliability of the behavior prediction (lower level plan) of the vehicle D is set for use during lower level plan generation in the travel control plan generation unit 22 of the vehicle A. The reliability of the manually driven communicative vehicle D is set to be higher than the reliability of the manually driven non-communicative vehicle C and lower than the reliability of the automatically driven vehicle B.

The transmission unit 132 transmits the behavior prediction (lower level plan) of the vehicle D to the vehicle A. When the display unit 120 or a driving support apparatus such as an ACC (adaptive cruise control) apparatus or an LKA (lane keep assist) apparatus exists in the non-automatically driven vehicle D, the behavior suggestion unit 118 generates a preferable behavior for the driver or the driving support apparatus. The display unit 120 displays the preferable driving method as a suggestion to the driver performing manual driving. The ACC/LKA correction unit 122 generates a target speed correction and a steering assist torque corresponding to the ACC/LKA driving support apparatus or the like in accordance with the preferred driving method.

Hence, when the communicative manually driven vehicle D exists, the behavior of the peripheral vehicle D, which may affect the home vehicle A, can be predicted with a high degree of precision through cooperation with the peripheral vehicle D, and therefore an appropriate travel control plan can be generated for the automatically driven vehicle A in a traffic environment where automatically driven vehicles and manually driven vehicles coexist. Moreover, suggestions for preferred driving directions and driving support can be issued to the vehicle D.

Figure 8:
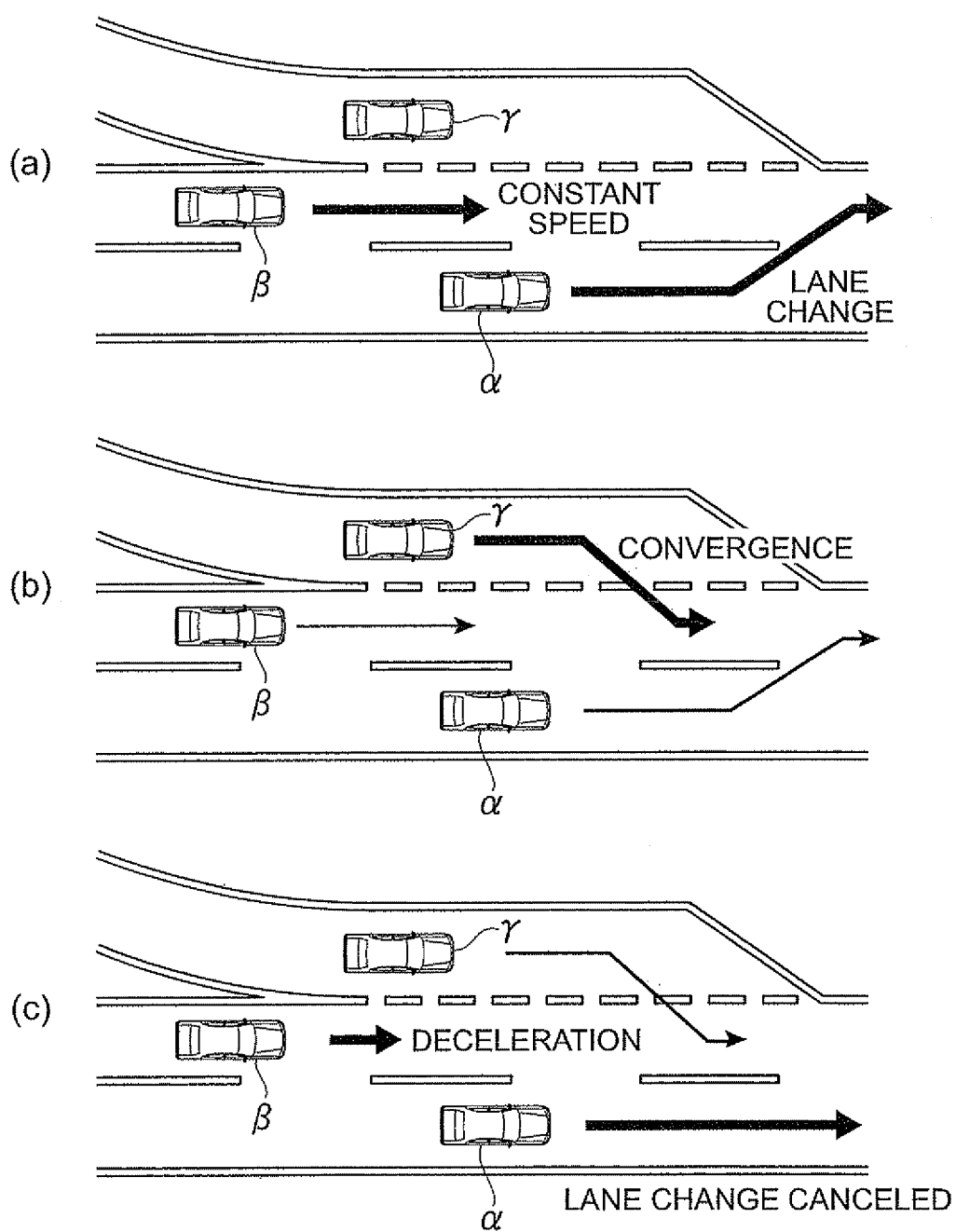
FIG. 8 is a view illustrating optimum control during vehicle convergence.

Further, a traffic environment in which the automatically driven vehicle B and the manually driven non-communicative vehicle C coexist as the peripheral vehicles of the automatically driven vehicle A and a traffic environment in which the manually driven communicative vehicle D exists were described in the above embodiment, but an optimum lower level plan can also be generated for all vehicles in a case where convergence is considered within an environment where a plurality of automatically driven vehicles α, β, γ coexist, as shown in FIG. 8. More specifically, as shown in FIG. 8(a), when a lower level plan according to which a vehicle α performs a lane change while a vehicle β travels at a constant speed is generated, the lower level plan is shared among the vehicles α, β, γ such that first, a safest lower level plan is generated for a convergence vehicle γ in relation to the main road vehicles α, β, as shown in FIG. 8(b), and on the basis thereof, the vehicle β is decelerated, the lane change to be performed by the vehicle α is canceled, and so on, as shown in FIG. 8(c). Thus, optimum overall vehicle control can be performed. In this case, the behavior of a manually driven vehicle can be predicted when such a vehicle is present, and therefore optimum vehicle control can still be performed.

Furthermore, in the above embodiment, a case in which the travel control plan generating system 1 is installed in the automatically driven vehicle A was described, but the system 1 may be provided on the infrastructure facility side.

Industrial Applicability

According to the present invention, a travel control plan generating system and a computer program capable of responding flexibly to variation in the conditions of a peripheral environment while satisfying a travel policy of a home vehicle can be provided.

The invention claimed is:

1. A travel control plan generating system for an automatically driven vehicle, comprising:
an upper level plan generating unit configured to generate an upper level plan corresponding to a travel policy of the vehicle, said upper level plan being generated for each divided section to the destination in units of a first distance and a first time scale;
a lower level plan generating unit configured to generate a lower level plan including at least a travel course, said lower level plan being generated in units of a second distance and a second time scale and configured to achieve said upper level plan of said each divided section, the second distance and the second time scale being smaller than the first distance and the first time scale, respectively;
a lower level plan obtaining unit configured to obtain a lower level plan including at least a travel course of a peripheral vehicle of said vehicle;
an evaluating unit configured to evaluate said lower level plan of said vehicle in accordance with a predetermined index, taking into account said lower level plan of said peripheral vehicle; and
a lower level plan selecting unit configured to select a lower level plan to be executed by said vehicle on the basis of an evaluation performed by said evaluating unit,
wherein said lower level plan obtaining unit includes an inferring unit configured to infer said lower level plan of said peripheral vehicle on the basis of a behavior of said peripheral vehicle, said lower level plan of said peripheral vehicle is obtained from an inference by said inferring unit,
said lower level plan obtaining unit further includes a communicating unit configured to communicate with said peripheral vehicle, said lower level plan including at least a travel course of said peripheral vehicle generated at said peripheral vehicle is obtained through communication performed by said communicating unit,
said evaluating unit is configured to evaluate said lower level plan of said vehicle taking into account a reliability of said lower level plan of said peripheral vehicle, and
a reliability of a lower level plan of said peripheral vehicle obtained from said inferring unit is set to be lower than a reliability of a lower level plan of an automatically driven peripheral vehicle obtained from said communicating unit.

2. The travel control plan generating system according to claim 1, wherein said lower level plan generating unit is configured to generate a plurality of lower level plans for said vehicle, and
said lower level plan selecting unit is configured to select said lower level plan to be executed from said plurality of lower level plans on the basis of said evaluation performed by said evaluating unit.

3. The travel control plan generating system according to claim 1, wherein said upper level plan generating unit is configured to regenerate said upper level plan when said lower level plan cannot be generated.

4. The travel control plan generating system according to claim 1, wherein said upper level plan generating unit is configured to regenerate said upper level plan in accordance with said evaluation performed by said evaluating unit.

5. The travel control plan generating system according to claim 1, wherein said lower level plan includes a speed pattern of said vehicle.

6. The travel control plan generating system according to claim 1, wherein:
the units of a first distance and a first time scale are several hundred meters and several tens of seconds, respectively; and
the units of a second distance and a second time scale are several centimeters and several tens of milliseconds, respectively.

7. The travel control plan generating system according to claim 1, wherein:
the reliability of the lower level plan obtained from said inferring unit and the reliability of the lower level plan from said communicating unit are respectively set based on a quality of the lower level plan obtained from said inferring unit and a quality of the lower level plan obtained from said communicating unit.

8. A non-transitory computer readable storage medium storing a program for causing a computer to execute a process, the process comprising:
generating an upper level plan corresponding to a travel policy of an automatically driven vehicle, said upper level plan being generated for each divided section to the destination in units of a first distance and a first time scale;

generating a lower level plan including at least a travel course, said lower level plan being generated in units of a second distance and a second time scale and configured to achieve said upper level plan of said each divided section, the second distance and the second time scale being smaller than the first distance and the first time scale, respectively;

obtaining a lower level plan including at least a travel course of a peripheral vehicle of said vehicle;

evaluating said lower level plan of said vehicle in accordance with a predetermined index, taking into account said lower level plan of said peripheral vehicle; and selecting a lower level plan to be executed by said vehicle on the basis of an evaluation performed in said evaluating step, wherein said obtaining a lower level plan includes inferring said lower level plan of said peripheral vehicle on the basis of a behavior of said peripheral vehicle, said lower level plan of said peripheral vehicle is obtained from an inference by said inferring, said obtaining a lower level plan further includes communicating with said peripheral vehicle, said lower level plan including at least a travel course of said peripheral vehicle generated at said peripheral vehicle is obtained through communication performed by said communicating, said evaluating evaluates said lower level plan of said vehicle taking into account a reliability of said lower level plan of said peripheral vehicle, and a reliability of a lower level plan obtained from said inferring is set to be lower than a reliability of a lower level plan of an automatically driven vehicle obtained from said communicating.

9. The non-transitory computer readable storage medium according to claim 8, wherein:

the reliability of the lower level plan obtained from said inferring unit and the reliability of the lower level plan from said communicating unit are respectively set based on a quality of the lower level plan obtained from said inferring unit and a quality of the lower level plan obtained from said communicating unit.

10. A travel control plan generating system for an automatically driven vehicle, comprising:

a travel plan generating unit configured to generate a travel plan including at least a travel course;

a travel plan obtaining unit configured to obtain a travel plan including at least a travel course of a peripheral vehicle of said vehicle;

an evaluating unit configured to evaluate said travel plan of said vehicle in accordance with a predetermined index, taking into account said travel plan of said peripheral vehicle; and a travel plan selecting unit configured to select a travel plan to be executed by said vehicle on the basis of an evaluation performed by said evaluating unit, wherein said travel plan obtaining unit includes an inferring unit configured to infer said travel plan of said peripheral vehicle on the basis of a behavior of said peripheral vehicle, said travel plan of said peripheral vehicle is obtained from an inference by said inferring unit, said travel plan obtaining unit further includes a communicating unit configured to communicate with said peripheral vehicle, said travel plan including at least a travel course of said peripheral vehicle generated at said peripheral vehicle is obtained through communication performed by said communicating unit, said evaluating unit is configured to evaluate said travel plan of said vehicle taking into account a reliability of said travel plan of said peripheral vehicle, and a reliability of a travel plan of said peripheral vehicle obtained from said inferring is set to be lower than a reliability of a travel plan of a peripheral vehicle obtained from said communicating unit.

* * * * *